United States Patent [19]

Schiffman et al.

[11] 4,205,929

[45] Jun. 3, 1980

[54] SLURRY TRANSPORT MEDIUM

[76] Inventors: Louis Schiffman, 1837 Merritt Rd., Abington, Pa. 19001; Walter Rosenthal, 150 E. 74th St., New York, N.Y. 10021

[21] Appl. No.: 888,568

[22] Filed: Mar. 20, 1978

[51] Int. Cl.$^2$ ............................................. B65G 53/04
[52] U.S. Cl. ...................................... 406/197; 44/51; 252/1
[58] Field of Search ................ 44/51; 302/14; 302/66; 406/197

[56] References Cited

U.S. PATENT DOCUMENTS

| | | | |
|---|---|---|---|
| 3,168,350 | 2/1965 | Phinney et al. | 44/51 X |
| 3,359,040 | 12/1967 | Every et al. | 44/51 X |

OTHER PUBLICATIONS

Althouse et al., Modern Refrigeration and Air Conditioning, The Good Heart–Willcox Co., Inc., 1975, pp. 30 and 947.
Encyclopedia Britannica, vol. 8, William Benton, Publisher, Chicago, 1974, p. 305.
Lange's Handbook of Chemistry Handbook Publishers, Inc., Sandusky, Ohio 1946, p. 1363.
Rice et al., Environmental Considerations in The Use of Saline Water in Coal Slurry Pipelines, pp. 3-1 to 3-17, Procedings of "The International Technical Conference on Slurry Transportation" Feb. 3-4 1976.

*Primary Examiner*—Leland A. Sebastian
*Attorney, Agent, or Firm*—B. Max Klevit

[57] ABSTRACT

This invention provides for an improvement in slurry transport systems, especially coal slurry lines. Instead of the usual use of fresh water resources which, in some geographic areas, are scarce for slurry transport, concentrated brine is used which is prepared from abundant salt water resources. Because of the higher density of this concentrated brine, it is a superior carrier of pulverized material. It dimishes the separation and settling tendency of slurry components during transport and particularly during shutdown. Other advantages in the use of concentrated brine include: freezing point depression which permits ease of transport during winter and at lower temperatures; dust suppression of stored coal; avoidance of spontaneous combustion of stored coal; inhibit freeze packing of dewatered pipeline coal; and diminished extent of corrosion in ferrous metal pipelines as compared to that which might occur with lower concentration brines. Important in the economy of the process is that the concentrated brine can be recycled. An inexpensive method for producing the concentrated brine is given.

4 Claims, No Drawings

4,205,929

SLURRY TRANSPORT MEDIUM

BACKGROUND OF THE INVENTION

1. Field of the Invention

The present invention relates generally to the field of slurry transport systems and is particularly concerned with the use of concentrated brine as the fluid medium of transport.

2. Prior Art

The concept of transporting through a pipeline, pulverized solid particles suspended in a fluid medium dates back over 100 years to its use in the 1850's for placer mining operations. This is noted in the publication: The Transportation of Solids in Steel Pipelines, Colorado School of Mines Research Foundation, Inc. 1963. In 1891, a patent was granted to Wallace C. Andrews, for a method of pumping coal with water. In 1914, an operating system employing an 8-inch line was constructed to transport coal into London. The transportation of minerals in slurry form through pipelines is well-known in the art as evidenced by comprehensive references listed in: Slurry Transportation Bibliography, published by the Slurry Transportation Association, Washington, D.C. The bibliographic listings pp. 1-41 cover the transport of a variety of minerals, and particular reference is given to listings on pp. 19 to 29 covering the specific subject of coal slurry transport systems.

Although coal and other minerals recovered in remote areas are now being transported in some instances through slurry pipelines, it does not as yet constitute a major mode of transport. Because of our dire energy needs, and because of the abundant sources of coal existing in remote geographic areas, it is expected that transport of coal in slurry form through pipelines will become increasingly more important. Ease of handling, greater capacity, and lower costs, are some of the distinct advantages of slurry transport as compared to other means of coal transportation such as by railroad cars, tankers, and trucks. There is an inherently greater efficiency of transport that increases with volume and/or distance.

There are in existence today, several major slurry pipeline systems in the United States. These are summarized in an article by John F. Kiefner: Review of Slurry System Projects In The U.S., pp. 10-1, Proceedings of The International Technical Conference on Slurry Transportation, February 3-4, 1976, Battelle Memorial Institute, Columbus, Ohio.

The only coal pipeline now in operation is the Black Mesa pipeline, an 18-inch line which transports coal from the Black Mesa in Arizona to a power plant in southern Nevada, for a distance of 273 miles. This line delivers approximately 5 millions of tons of coal per year, at a cost estimated to be somewhat more than half the cost that would be incurred through use of rail transport. In addition to the Black Mesa pipeline, there are currently 6 long distance coal pipelines either now under construction or in the planning stage in U.S.

One of the major drawbacks in the use of slurry pipeline for coal transport, is the consumptive use of potable water resources, particularly in the western coal resource areas of U.S. It has been suggested that this environmental impact can be substantially reduced through the use of abundantly available saline groundwater.

In an article by T. K. Rice, T. M. Evans, M. Warner: Environmental Considerations of The Use of Saline Water in Coal Slurry Pipelines, pp. 3-3 to 3-17, Proceedings of the International Technical Conference on Slurry Transportation, February 3-4, 1976, Battelle Memorial Institute, Columbus, Ohio, it is noted that a coal pipeline moving 25 million tons of coal annually requires at its source, about 15,000 acre-feet of water per year. It is further noted that most of the country's coal reserves are located in western states and areas which are generally potable water poor. The authors indicate that saline groundwater generally underlays most of the United States. These waters, in varying quantities, salinity and degrees of accessability, contain at least 1,000 milligrams per liter (mg/L) and as much as about 35,000 mg/L of dissolved solids, with some of the major constituents being sodium chloride, sodium bicarbonate, calcium and sodium sulfates. It is suggested by the authors that one of the major environmental impacts of coal slurry pipeline operations, namely the consumptive use of potable water, can be substantially reduced by the use of saline groundwater.

SUMMARY OF THE INVENTION

In accordance with the present invention, saline waters from natural sources are concentrated to a brine, having a specific gravity which falls in the range from more than about 1.025 @ 20/4° C., to saturated solution where specific gravity may be as high as 1.2 @ 20/4° C., and preferably to a range from 1.10 @ 20/4° C. to saturated solution to provide an improved medium for slurry transport. The higher density and viscosity of the concentrated brine diminishes the separation and settling tendencies of the slurry components. Transport in colder weather is facilitated due to freezing point depression of the fluid medium. Beneficial effects, such as dust suppression and inhibition of freeze packing are obtained on the dewatered coal.

DETAILED DESCRIPTION

A wide selection of available salt water sources is applicable for purposes of concentrating, to provide an improved medium for pipeline slurry transport. Sea water, inland seas, brackish sounds, bays, bayous, estuaries, and brackish groundwaters in general are abundantly available in U.S. Brackish water is generally considered as having 1,000 parts per million (1,000 mg. per liter) of dissolved minerals. Sea water is generally considered as having in the order of 35,000 parts per million (35,000 mg. per liter) of dissolved solids.

It was found that if salt solutions of the type mentioned above, are concentrated to a brine having a specific gravity which falls in the range from more than about 1.025 @ 20/4° C. to saturated solution where specific gravity may be as high as 1.2 @ 20/4° C., and preferably to a range from 1.10 @ 20/4° C. to saturated solution, the preferred levels corresponding about in the order of magnitude of 125,000 mg. per liter of dissolved solids or more, it provides a superior medium for slurry transport.

The higher specific gravity and viscosity of the fluid transport medium, and the relative increased proximity in density between the carrier medium and the pulverized minerals, diminishes the separation and settling tendency of the slurry transport components during transport and particularly during shutdown. Especially in the case of transport of coal where specific gravity of the majority of national grades ranges from 1.25 to 1.45 for bituminous coal, and 1.45 to 1.7 for anthracite coal.

Another advantage in the use of the concentrated brine as a transport medium is the freezing point depression which may be as much as 20° C. This would facilitate transport in cold weather and particularly in cold regions.

Benefits are also obtained through the use of concentrated brine, upon dewatering of the coal and subsequent storage in that it provides dust suppression, and avoidance of spontaneous combustion.

Another benefit is that it inhibits "freeze packing" of stored coal and facilitates unloading of coal in cold weather. A perennial winter problem is unloading of frozen coal. In the past, frozen coal has afforded much difficulty in unloading, and required such means as crowbars, picks, and other mechanical methods. The residual salts, such as calcium and sodium chloride, contained in the brine solutions of this invention, prevent water on the surface of the coal from freezing, and thus avoids freeze packing and the subsequent difficulties of unloading.

Still, another benefit in the use of concentrated brine is the factor of diminished corrosion that occurs in ferrous pipelines, as compared to that which occurs with the use of dilute salt solutions.

It is to be noted that, although the nature of dissolved salts may vary depending upon their source, the particular nature of the components are not critical, especially in that the major portion would generally comprise sodium chloride. It is a further object of this invention, adding greatly to the economic feasibility of the process, that after dewatering the coal, the concentrated brine is recycled with minor replenishment, or used in other areas of industrial application. In case of recycling, it is piped back to the origin of the slurry transport system. If used in other industrial applications, it might find such varied use as in refrigeration plants, food packing industry, salt manufacturing, and in the chemical processing industry.

It is another object of this invention to provide a novel and inexpensive method for making the concentrated brine. The process may be applied in batch or continuous operation. The concentrated brine, according to this invention, is made by causing sea water, or diluted salt water, or brackish water, from a variety of natural sources to flow through open shallow wide channels across plane areas of no or negligible rainfall.

In this process, the sun's heat is used to concentrate the salt water. Focusing devices may also be used to develop higher temperatures and more rapid evaporation. A successful operation depends on the width, depth, and length of the channel or channels, the degree of temperature, the duration of the dry weather and properly-controlled flow. Remedial piping may be necessary at uneven or hilly parts, or other means such as pumping if speed-up of flow is desired. The width and other measurements of channels can vary also according to features of the areas involved. Piping would be necessary at road and rail crossing or in cold or rainy areas. The salt channels may in general, be located in close proximity to the slurry lines. If, and where geographically, and climatologically feasible, aggregates of close turn serpentine channels could be used in order to concentrate evaporation to certain limited areas. The above systems can be connected with pipes which may be occasionally necessary to adjust for uneven territory or unfavorable climatic conditions. In a batch process, interposed basins may be included for storage purposes.

What is claimed:

1. The method which comprises concentrating natural saline water by evaporation to a specific gravity of at least 1.10 @ 20/4° C., suspending pulverized coal therein to form a slurry, and flowing said slurry to a desired location.

2. The method as defined in claim 1 further including the step of separating liquid from the slurry at said location and conducting the separated liquid to a desired point of use.

3. The method as defined in claim 2 wherein at said desired point of use, the separated liquid is concentrated to a specific gravity of at least 1.10 @ 20/4° C. for further use as a medium for slurry coal transportation.

4. The method as defined in claim 1 wherein the coal, after separation of the liquid, is stored in condition thus rendered less susceptible to spontaneous combustion and freeze packing.

* * * * *